(12) United States Patent
Kothari et al.

(10) Patent No.: US 7,893,919 B2
(45) Date of Patent: Feb. 22, 2011

(54) DISPLAY REGION ARCHITECTURES

(75) Inventors: Manish Kothari, Cupertino, CA (US); Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1417 days.

(21) Appl. No.: 11/040,822

(22) Filed: Jan. 21, 2005

(65) Prior Publication Data
US 2006/0066640 A1   Mar. 30, 2006

Related U.S. Application Data

(60) Provisional application No. 60/613,500, filed on Sep. 27, 2004.

(51) Int. Cl.
G09G 3/34    (2006.01)

(52) U.S. Cl. .................. 345/108; 345/87; 345/55; 345/204; 345/690

(58) Field of Classification Search .................. 345/108, 345/87, 55, 204
See application file for complete search history.

(56) References Cited

U.S. PATENT DOCUMENTS

| | | | |
|---|---|---|---|
| 2,534,846 A | 12/1950 | Ambrose et al. | |
| 3,037,189 A | 5/1962 | Barrett et al. | |
| 3,210,757 A | 10/1965 | Jacob | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,725,868 A | 4/1973 | Malmer, Jr. et al. | |

(Continued)

FOREIGN PATENT DOCUMENTS

DE     4108966 A1    8/1992

(Continued)

OTHER PUBLICATIONS

Butler et al., "An Embedded Overlay Concept for Microsystems Packaging," IEEE Transactions on Advanced Packaging IEEE USA, vol. 23, No. 4, pp. 617-622, XP002379648 (2000).

(Continued)

*Primary Examiner*—Richard Hjerpe
*Assistant Examiner*—Leonid Shapiro
(74) *Attorney, Agent, or Firm*—Knobbe Martens Olson & Bear, LLP

(57) ABSTRACT

A bit depth of a pixel comprising multiple display elements, such as interferometric modulators, may be increased through the use of display elements having different intensities, while the lead count is minimally increased. An exemplary pixel with at least one display element having an intensity of 0.5 and N display elements each having an intensity of one can provide about 2N+1 shades (e.g., 0, 0.5, 1.0, 1.5, 2.0, [N+0.5]). In comparison, a pixel having N display elements, each having an intensity of one, can only provide about N+1 shades (e.g., 0, 1, 2, . . . , N). Thus, using at least one display element having an intensity lower than the intensity of each of the other display elements increases the number of shades provided by the pixel by an approximate factor of two and increases the bit depth of the pixel, while minimizing the number of additional leads.

20 Claims, 8 Drawing Sheets

U.S. PATENT DOCUMENTS

| | | | |
|---|---|---|---|
| 3,813,265 A | 5/1974 | Marks |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | Te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |

| | | | | | | |
|---|---|---|---|---|---|---|
| 5,608,468 | A | 3/1997 | Gove et al. | 6,239,777 B1 | 5/2001 | Sugahara et al. |
| 5,610,438 | A | 3/1997 | Wallace et al. | 6,243,149 B1 | 6/2001 | Swanson et al. |
| 5,610,624 | A | 3/1997 | Bhuva | 6,282,010 B1 | 8/2001 | Sulzbach et al. |
| 5,610,625 | A | 3/1997 | Sampsell | 6,285,424 B1 | 9/2001 | Yoshida |
| 5,614,937 | A | 3/1997 | Nelson | 6,288,472 B1 | 9/2001 | Cabuz et al. |
| 5,619,059 | A | 4/1997 | Li et al. | 6,288,824 B1 | 9/2001 | Kastalsky |
| 5,619,365 | A | 4/1997 | Rhoads et al. | 6,295,154 B1 | 9/2001 | Laor et al. |
| 5,619,366 | A | 4/1997 | Rhoads et al. | 6,323,982 B1 | 11/2001 | Hornbeck |
| 5,629,790 | A | 5/1997 | Neukermans et al. | 6,327,071 B1 | 12/2001 | Kimura |
| 5,633,652 | A | 5/1997 | Kanbe et al. | 6,331,909 B1 | 12/2001 | Dunfield |
| 5,636,052 | A | 6/1997 | Arney et al. | 6,335,831 B2 | 1/2002 | Kowarz et al. |
| 5,636,185 | A | 6/1997 | Brewer et al. | 6,356,254 B1 | 3/2002 | Kimura |
| 5,638,084 | A | 6/1997 | Kalt | 6,356,378 B1 | 3/2002 | Huibers |
| 5,638,946 | A | 6/1997 | Zavracky | 6,358,021 B1 | 3/2002 | Cabuz |
| 5,641,391 | A | 6/1997 | Hunter et al. | 6,376,787 B1 | 4/2002 | Martin et al. |
| 5,646,768 | A | 7/1997 | Kaeriyama | 6,407,851 B1 | 6/2002 | Islam et al. |
| 5,650,881 | A | 7/1997 | Hornbeck | 6,417,868 B1 | 7/2002 | Bock et al. |
| 5,654,741 | A | 8/1997 | Sampsell et al. | 6,438,282 B1 | 8/2002 | Takeda et al. |
| 5,657,099 | A | 8/1997 | Doherty et al. | 6,447,126 B1 | 9/2002 | Hornbeck |
| 5,659,374 | A | 8/1997 | Gale, Jr. et al. | 6,449,084 B1 | 9/2002 | Guo |
| 5,661,591 | A | 8/1997 | Lin et al. | 6,456,420 B1 | 9/2002 | Goodwin-Johansson |
| 5,665,997 | A | 9/1997 | Weaver et al. | 6,465,355 B1 | 10/2002 | Horsley |
| 5,673,139 | A | 9/1997 | Johnson | 6,466,190 B1 | 10/2002 | Evoy |
| 5,683,591 | A | 11/1997 | Offenberg | 6,466,354 B1 | 10/2002 | Gudeman |
| 5,703,710 | A | 12/1997 | Brinkman et al. | 6,466,358 B2 | 10/2002 | Tew |
| 5,710,656 | A | 1/1998 | Goossen | 6,473,072 B1 | 10/2002 | Comiskey et al. |
| 5,726,480 | A | 3/1998 | Pister | 6,473,274 B1 | 10/2002 | Maimone et al. |
| 5,739,945 | A | 4/1998 | Tayebati | 6,480,177 B2 | 11/2002 | Doherty et al. |
| 5,740,150 | A | 4/1998 | Uchimaru et al. | 6,496,122 B2 | 12/2002 | Sampsell |
| 5,745,193 | A | 4/1998 | Urbanus et al. | 6,545,335 B1 | 4/2003 | Chua et al. |
| 5,745,281 | A | 4/1998 | Yi et al. | 6,548,908 B2 | 4/2003 | Chua et al. |
| 5,751,469 | A | 5/1998 | Arney et al. | 6,549,338 B1 | 4/2003 | Wolverton et al. |
| 5,771,116 | A | 6/1998 | Miller et al. | 6,552,840 B2 | 4/2003 | Knipe |
| 5,784,190 | A | 7/1998 | Worley | 6,574,033 B1 | 6/2003 | Chui et al. |
| 5,784,212 | A | 7/1998 | Hornbeck | 6,589,625 B1 | 7/2003 | Kothari et al. |
| 5,786,927 | A | 7/1998 | Greywall et al. | 6,600,201 B2 | 7/2003 | Hartwell et al. |
| 5,793,504 | A | 8/1998 | Stoll | 6,606,175 B1 | 8/2003 | Sampsell et al. |
| 5,808,780 | A | 9/1998 | McDonald | 6,608,268 B1 | 8/2003 | Goldsmith |
| 5,808,781 | A | 9/1998 | Arney et al. | 6,624,944 B1 | 9/2003 | Wallace et al. |
| 5,818,095 | A | 10/1998 | Sampsell | 6,625,047 B2 | 9/2003 | Coleman, Jr. |
| 5,825,528 | A | 10/1998 | Goossen | 6,630,786 B2 | 10/2003 | Cummings et al. |
| 5,835,255 | A | 11/1998 | Miles | 6,632,698 B2 | 10/2003 | Ives |
| 5,838,484 | A | 11/1998 | Goossen et al. | 6,635,919 B1 | 10/2003 | Melendez et al. |
| 5,842,088 | A | 11/1998 | Thompson | 6,643,069 B2 | 11/2003 | Dewald |
| 5,905,482 | A | 5/1999 | Hughes et al. | 6,650,455 B2 | 11/2003 | Miles |
| 5,912,758 | A | 6/1999 | Knipe et al. | 6,657,832 B2 | 12/2003 | Williams et al. |
| 5,943,158 | A | 8/1999 | Ford et al. | 6,660,656 B2 | 12/2003 | Cheung et al. |
| 5,959,763 | A | 9/1999 | Bozler et al. | 6,666,561 B1 | 12/2003 | Blakley |
| 5,986,796 | A | 11/1999 | Miles | 6,674,090 B1 | 1/2004 | Chua et al. |
| 5,994,174 | A | 11/1999 | Carey et al. | 6,674,562 B1 | 1/2004 | Miles |
| 6,028,690 | A | 2/2000 | Carter et al. | 6,674,563 B2 | 1/2004 | Chui et al. |
| 6,038,056 | A | 3/2000 | Florence et al. | 6,680,792 B2 | 1/2004 | Miles |
| 6,040,937 | A | 3/2000 | Miles | 6,710,908 B2 | 3/2004 | Miles et al. |
| 6,046,840 | A | 4/2000 | Huibers | 6,741,377 B2 | 5/2004 | Miles |
| 6,049,317 | A | 4/2000 | Thompson et al. | 6,741,383 B2 | 5/2004 | Huibers et al. |
| 6,055,090 | A | 4/2000 | Miles | 6,741,384 B1 | 5/2004 | Martin et al. |
| 6,056,406 | A | 5/2000 | Park et al. | 6,741,503 B1 | 5/2004 | Farris et al. |
| 6,061,075 | A | 5/2000 | Nelson et al. | 6,747,785 B2 | 6/2004 | Chen et al. |
| 6,097,145 | A | 8/2000 | Kastalsky et al. | 6,747,800 B1 | 6/2004 | Lin |
| 6,099,132 | A | 8/2000 | Kaeriyama | 6,775,174 B2 | 8/2004 | Huffman et al. |
| 6,100,861 | A * | 8/2000 | Cohen et al. .................. 345/88 | 6,778,155 B2 | 8/2004 | Doherty et al. |
| 6,100,872 | A | 8/2000 | Aratani et al. | 6,794,119 B2 | 9/2004 | Miles |
| 6,113,239 | A | 9/2000 | Sampsell et al. | 6,809,788 B2 | 10/2004 | Yamada et al. |
| 6,147,790 | A | 11/2000 | Meier et al. | 6,811,267 B1 | 11/2004 | Allen et al. |
| 6,158,156 | A | 12/2000 | Patrick | 6,813,059 B2 | 11/2004 | Hunter et al. |
| 6,160,833 | A | 12/2000 | Floyd et al. | 6,819,469 B1 | 11/2004 | Koba |
| 6,171,945 | B1 | 1/2001 | Mandal et al. | 6,822,628 B2 | 11/2004 | Dunphy et al. |
| 6,172,797 | B1 | 1/2001 | Huibers | 6,829,132 B2 | 12/2004 | Martin et al. |
| 6,180,428 | B1 | 1/2001 | Peeters et al. | 6,853,129 B1 | 2/2005 | Cummings et al. |
| 6,195,196 | B1 | 2/2001 | Kimura et al. | 6,855,610 B2 | 2/2005 | Tung et al. |
| 6,201,633 | B1 | 3/2001 | Peeters et al. | 6,859,218 B1 | 2/2005 | Luman et al. |
| 6,215,221 | B1 | 4/2001 | Cabuz et al. | 6,861,277 B1 | 3/2005 | Monroe et al. |
| 6,232,936 | B1 | 5/2001 | Gove et al. | 6,862,022 B2 | 3/2005 | Slupe |

| | | | | | | |
|---|---|---|---|---|---|---|
| 6,862,029 B1 | 3/2005 | D'Souza et al. | | 2004/0147056 A1 | 7/2004 | McKinnell et al. |
| 6,867,896 B2 | 3/2005 | Miles | | 2004/0147198 A1 | 7/2004 | Lin et al. |
| 6,870,581 B2 | 3/2005 | Li et al. | | 2004/0148009 A1 | 7/2004 | Buzzard et al. |
| 6,870,654 B2 | 3/2005 | Lin et al. | | 2004/0150939 A1 | 8/2004 | Huff |
| 6,882,458 B2 | 4/2005 | Lin et al. | | 2004/0160143 A1 | 8/2004 | Shreeve et al. |
| 6,882,461 B1 | 4/2005 | Tsai et al. | | 2004/0174583 A1 | 9/2004 | Chen et al. |
| 6,891,658 B2 | 5/2005 | Whitehead et al. | | 2004/0175577 A1 | 9/2004 | Lin et al. |
| 6,912,022 B2 | 6/2005 | Lin et al. | | 2004/0179281 A1 | 9/2004 | Reboa |
| 6,947,200 B2 | 9/2005 | Huibers | | 2004/0179445 A1 | 9/2004 | Park et al. |
| 6,952,303 B2 | 10/2005 | Lin et al. | | 2004/0184766 A1 | 9/2004 | Kim et al. |
| 6,958,847 B2 | 10/2005 | Lin | | 2004/0201908 A1 | 10/2004 | Kaneko |
| 6,959,990 B2 | 11/2005 | Penn | | 2004/0207897 A1 | 10/2004 | Lin |
| 6,980,350 B2 | 12/2005 | Hung et al. | | 2004/0209192 A1 | 10/2004 | Lin et al. |
| 7,008,812 B1 | 3/2006 | Carley | | 2004/0209195 A1 | 10/2004 | Lin |
| 7,053,737 B2 | 5/2006 | Schwartz et al. | | 2004/0212026 A1 | 10/2004 | Van Brocklin et al. |
| 7,075,700 B2 | 7/2006 | Muenter | | 2004/0217378 A1 | 11/2004 | Martin et al. |
| 7,123,216 B1 | 10/2006 | Miles | | 2004/0217919 A1 | 11/2004 | Piehl et al. |
| 7,161,728 B2 | 1/2007 | Sampsell et al. | | 2004/0218251 A1 | 11/2004 | Piehl et al. |
| 7,250,930 B2 | 7/2007 | Hoffman et al. | | 2004/0218334 A1 | 11/2004 | Martin et al. |
| 7,532,381 B2 | 5/2009 | Miles et al. | | 2004/0218341 A1 | 11/2004 | Martin et al. |
| 7,663,794 B2 | 2/2010 | Cummings | | 2004/0227493 A1 | 11/2004 | Van Brocklin et al. |
| 2001/0003487 A1 | 6/2001 | Miles | | 2004/0233503 A1 | 11/2004 | Kimura |
| 2001/0028503 A1 | 10/2001 | Flanders et al. | | 2004/0240032 A1 | 12/2004 | Miles |
| 2002/0014579 A1 | 2/2002 | Dunfield | | 2004/0240138 A1 | 12/2004 | Martin et al. |
| 2002/0015215 A1 | 2/2002 | Miles | | 2004/0245588 A1 | 12/2004 | Nikkel et al. |
| 2002/0021485 A1 | 2/2002 | Pilossof | | 2004/0263944 A1 | 12/2004 | Miles et al. |
| 2002/0024711 A1 | 2/2002 | Miles | | 2005/0001828 A1 | 1/2005 | Martin et al. |
| 2002/0027636 A1 | 3/2002 | Yamada | | 2005/0002082 A1 | 1/2005 | Miles |
| 2002/0054424 A1 | 5/2002 | Miles | | 2005/0003667 A1 | 1/2005 | Lin et al. |
| 2002/0070931 A1 | 6/2002 | Ishikawa | | 2005/0014374 A1 | 1/2005 | Partridge et al. |
| 2002/0075555 A1 | 6/2002 | Miles | | 2005/0024557 A1 | 2/2005 | Lin |
| 2002/0114558 A1 | 8/2002 | Nemirovsky | | 2005/0035699 A1 | 2/2005 | Tsai |
| 2002/0126364 A1 | 9/2002 | Miles | | 2005/0036095 A1 | 2/2005 | Yeh et al. |
| 2002/0139981 A1 | 10/2002 | Young | | 2005/0036192 A1 | 2/2005 | Lin et al. |
| 2002/0146200 A1 | 10/2002 | Kurdle et al. | | 2005/0038950 A1 | 2/2005 | Adelmann |
| 2002/0149828 A1 | 10/2002 | Miles | | 2005/0042117 A1 | 2/2005 | Lin |
| 2002/0149850 A1 | 10/2002 | Heffner et al. | | 2005/0046922 A1 | 3/2005 | Lin et al. |
| 2002/0154422 A1 | 10/2002 | Sniegowski et al. | | 2005/0046948 A1 | 3/2005 | Lin |
| 2002/0167072 A1 | 11/2002 | Andosca | | 2005/0057442 A1 | 3/2005 | Way |
| 2002/0167730 A1 | 11/2002 | Needham et al. | | 2005/0068583 A1 | 3/2005 | Gutkowski et al. |
| 2002/0186483 A1 | 12/2002 | Hagelin et al. | | 2005/0068605 A1 | 3/2005 | Tsai |
| 2003/0015936 A1 | 1/2003 | Yoon et al. | | 2005/0068606 A1 | 3/2005 | Tsai |
| 2003/0016428 A1 | 1/2003 | Kato et al. | | 2005/0069209 A1 | 3/2005 | Damera-Venkata et al. |
| 2003/0029705 A1 | 2/2003 | Qiu et al. | | 2005/0078348 A1 | 4/2005 | Lin |
| 2003/0035196 A1 | 2/2003 | Walker | | 2005/0122294 A1* | 6/2005 | Ben-David et al. ............ 345/87 |
| 2003/0043157 A1 | 3/2003 | Miles | | 2005/0157364 A1 | 7/2005 | Lin |
| 2003/0053078 A1 | 3/2003 | Missey et al. | | 2005/0168849 A1 | 8/2005 | Lin |
| 2003/0072070 A1 | 4/2003 | Miles | | 2005/0195462 A1 | 9/2005 | Lin |
| 2003/0156315 A1 | 8/2003 | Li et al. | | 2005/0195467 A1 | 9/2005 | Kothari et al. |
| 2003/0202264 A1 | 10/2003 | Weber et al. | | 2005/0202649 A1 | 9/2005 | Hung et al. |
| 2003/0202265 A1 | 10/2003 | Reboa et al. | | 2005/0249966 A1 | 11/2005 | Tung et al. |
| 2003/0202266 A1 | 10/2003 | Ring et al. | | 2006/0044654 A1 | 3/2006 | Vandorpe et al. |
| 2003/0210851 A1 | 11/2003 | Fu et al. | | 2006/0066935 A1 | 3/2006 | Cummings et al. |
| 2004/0008396 A1 | 1/2004 | Stappaerts | | 2006/0077155 A1 | 4/2006 | Chui et al. |
| 2004/0008438 A1 | 1/2004 | Sato | | 2006/0077533 A1 | 4/2006 | Miles et al. |
| 2004/0027671 A1 | 2/2004 | Wu et al. | | 2006/0139723 A9 | 6/2006 | Miles |
| 2004/0027701 A1 | 2/2004 | Ishikawa | | 2006/0250326 A1* | 11/2006 | Wampler ..................... 345/55 |
| 2004/0051929 A1 | 3/2004 | Sampsell et al. | | 2007/0229936 A1 | 10/2007 | Miles |
| 2004/0056742 A1 | 3/2004 | Dabbaj | | 2007/0268211 A1 | 11/2007 | Whitehead et al. |
| 2004/0058532 A1 | 3/2004 | Miles et al. | | 2008/037093 A1 | 2/2008 | Miles |
| 2004/0075967 A1 | 4/2004 | Lynch et al. | | 2008/0088904 A1 | 4/2008 | Miles |
| 2004/0080035 A1 | 4/2004 | Delapierre | | 2008/0088911 A1 | 4/2008 | Miles |
| 2004/0080807 A1 | 4/2004 | Chen et al. | | 2008/0088912 A1 | 4/2008 | Miles |
| 2004/0100594 A1 | 5/2004 | Huibers et al. | | 2008/0106782 A1 | 5/2008 | Miles |
| 2004/0100677 A1 | 5/2004 | Huibers et al. | | | | |
| 2004/0100680 A1 | 5/2004 | Huibers et al. | | | | |
| 2004/0124483 A1 | 7/2004 | Partridge et al. | | | FOREIGN PATENT DOCUMENTS | |
| 2004/0125281 A1 | 7/2004 | Lin | | DE | 10228946 A1 | 1/2004 |
| 2004/0125347 A1 | 7/2004 | Patel et al. | | EP | 0 310 176 | 4/1989 |
| 2004/0136045 A1 | 7/2004 | Tran | | EP | 0 361 981 | 4/1990 |
| 2004/0140557 A1 | 7/2004 | Sun et al. | | EP | 0 667 548 A1 | 8/1995 |
| 2004/0145049 A1 | 7/2004 | McKinnell et al. | | EP | 0 788 005 | 8/1997 |
| 2004/0145811 A1 | 7/2004 | Lin et al. | | EP | 1275997 | 1/2003 |

| | | |
|---|---|---|
| EP | 1 435 336 | 7/2004 |
| EP | 1 439 515 | 7/2004 |
| EP | 1 484 632 A1 | 8/2004 |
| EP | 1 484 635 A1 * | 8/2004 |
| EP | 1 473 691 A | 11/2004 |
| EP | 1473581 A2 | 11/2004 |
| EP | 1484635 | 12/2004 |
| FR | 2 824 643 A | 11/2002 |
| JP | 62 082454 | 4/1987 |
| JP | 05275401 A1 | 10/1993 |
| JP | 9-127439 | 5/1997 |
| JP | 11211999 | 8/1999 |
| JP | 11211999 A | 11/1999 |
| JP | 2000306515 A | 11/2000 |
| JP | 2002-062490 | 2/2002 |
| JP | 2002277771 A | 9/2002 |
| JP | 2003-195201 | 7/2003 |
| JP | 2003195201 A | 7/2003 |
| JP | 2004157527 A | 6/2004 |
| JP | 2004235465 A | 8/2004 |
| JP | 2004286825 A | 10/2004 |
| TW | 157313 | 5/1991 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO 02/079853 | 10/2002 |
| WO | WO03007049 A1 | 1/2003 |
| WO | WO 03/014789 A2 | 2/2003 |
| WO | WO 03/054925 | 7/2003 |
| WO | WO03/054925 A | 7/2003 |
| WO | WO 03/069404 | 8/2003 |
| WO | WO03/069413 A | 8/2003 |
| WO | WO03069413 A1 | 8/2003 |
| WO | WO03073151 A1 | 9/2003 |
| WO | WO 03/085728 A1 | 10/2003 |
| WO | WO2004006003 A1 | 1/2004 |
| WO | WO2004026757 A2 | 4/2004 |
| WO | WO 2004/042687 | 5/2004 |
| WO | WO 2005/010566 | 2/2005 |
| WO | WO 2005/006364 A1 | 10/2005 |
| WO | WO 2006/014929 | 2/2006 |

OTHER PUBLICATIONS

Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.

Chunjun Wang et al., "Flexible curcuit-based RF MEMS Switches," MEMS. XP002379649 pp. 757-762, (Nov. 2001).

Goossen, "MEMS-based variable optical interference devices," Optical MEMS, 2000 IEEE/LEOS Int'l. Conf. on Aug. 21-24, 2000, Piscatawny, NJ, Aug. 21, 2000, pp. 17-18.

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Joannopoulos et al., "Molding the Flow of Light," Photonic Crystals. 1995.

Nagami et al., "Plastic Cell Architecture: Towards Reconfigurable Computing for General-Purpose," Proc. IEEE Workshop on FPGA-based Custom Computing Machines, (1998).

Peerlings et al., "Long Resonator Micromachined Tunable GaAs-AlAs Fabry-Perot Filter," IEEE Photonics Technology Letters, IEEE Service Center, Piscatawny, NJ, vol. 9, No. 9, Sep. 1997, pp. 1235-1237.

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.

Zhou et al., "Waveguide Panel Display Using Electromechanical Spatial Modulators," SID Digest, vol. XXIX, 1998.

International Search Report and Written Opinion of the International Searching Authority for PCT/US2005/005919 dated Aug. 24, 2005.

International Search Report Application No. PCT/US2005/026448, Dated Nov. 23, 2005.

International Search Report Application No. PCT/US2005/029820, Dated Dec. 27, 2005.

International Search Report Application No. PCT/US2005/030962, Dated Aug. 31, 2005.

International Search Report Application No. PCT/US2005/034465, Dated Sep. 23, 2005.

European Search Report Application No. 05255693.3-2217, dated May 24, 2006.

European Search Report Application No. EP 05 25 5673 in 9 pages, dated Jan. 23, 2006.

Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.

Fan et al., "Channel Drop Filters in Photonic Crystals, "Optics Express, vol. 3, No. 1, 1998.

Kim et al., "Control of Optical Transmission Through metals Perforated With Subwave-Length Hole Arrays," Optic Letters, vol. 24, No. 4, Feb. 15, 1999, pp. 256-257.

Lin et al., "Free-Space Micromachined Optical Switches for Optical Networking," IEEE Journal of Selected Topics in Quantum Electronics, vol. 5, No. 1m Jan./Feb. 1999, pp. 4-9.

Little et al., "Vertically Coupled Microring Resonator Channel Dropping Filter," IEEE Photonics Technology Letters, vol. 11, No. 2, 1999.

Magel, "Integrated Optic Devices Using Micromachined Metal Membranes," SPIE vol. 2686, 0-8194-2060-3/1996.

Science and Technology, The Economist, May 22, 1999, pp. 89-90.

Akasaka, "Three-Dimensional IC Trends", Proceedings of IEEE, vol. 74, No. 12, pp. 1703-1714, (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. I, Fundamentals, Techniques, and Design, Second Edition," McGraw-Hill, Inc., New York, pp. 2.29-2.36 (1995).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Vvinton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Extended European Search Report dated Jul. 6, 2006 in European App. No. 05255701.4.

Pape et al., Characteristics of the deformable mirror device for optical information processing, Optical Engineering, 22(6):676-681, Nov.-Dec. 1983.

Office Action dated Sep. 26, 2008 in Chinese App. No. 2005-101034487.

Official Communication for European App. No. 05255701.4, dated Jun. 26, 2008.

* cited by examiner

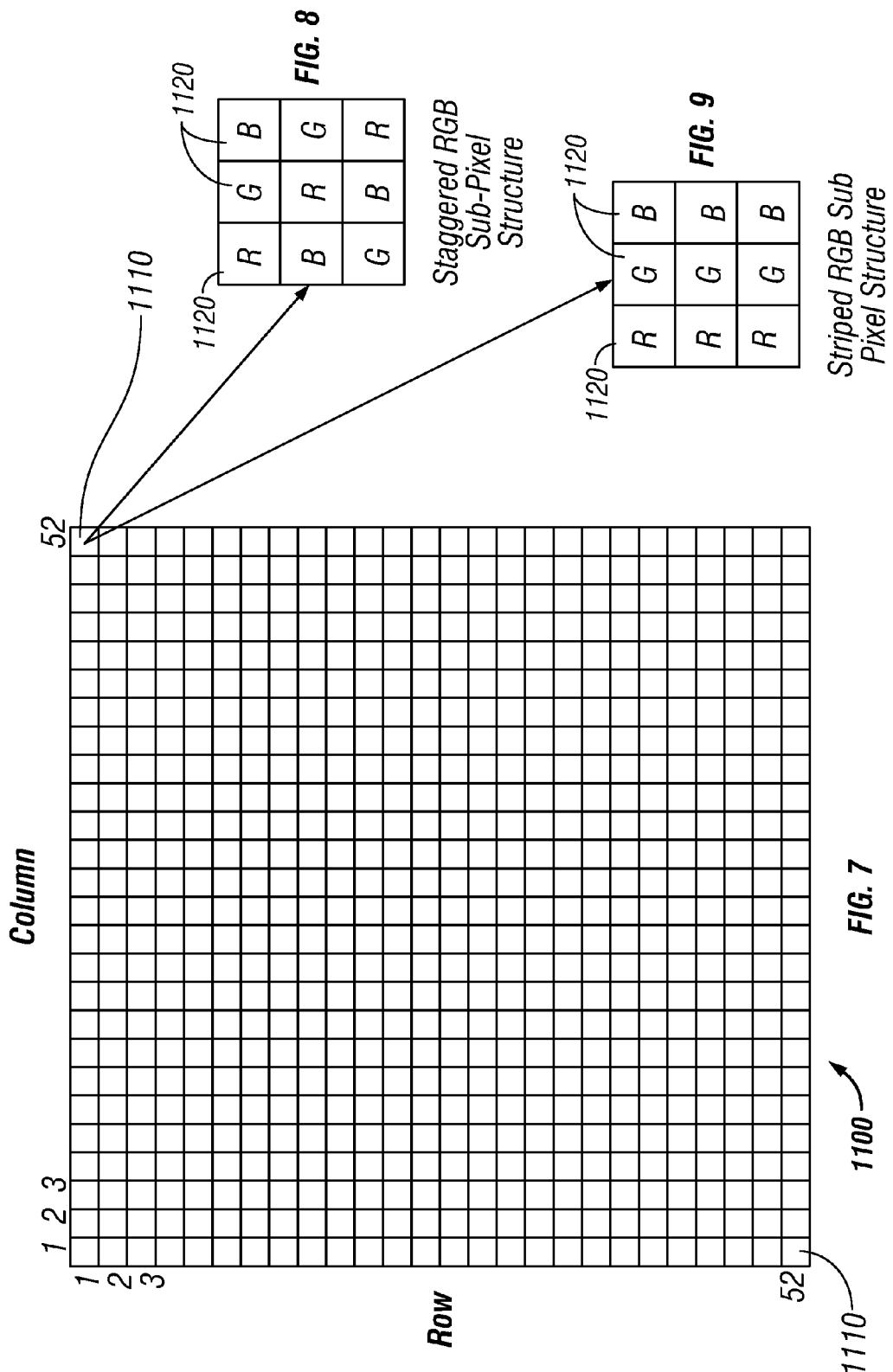

DISPLAY REGION ARCHITECTURES

CROSS-REFERENCE TO RELATED APPLICATIONS

This application claims priority under 35 U.S.C. §119(e) to U.S. Provisional Application Ser. No. 60/613,500, filed on Sep. 27, 2004, which is hereby expressly incorporated by reference in its entirety. This application is also related to co-pending U.S. patent application Ser. No. 10/731,989, titled "Area Array Modulation and Lead Reduction in Interferometric Modulators," filed Dec. 9, 2003.

BACKGROUND

1. Field of the Invention

The field of the invention relates generally to microelectromechanical systems (MEMS), and more particularly to architectures of display regions having arrays of MEMS elements.

2. Description of the Related Technology

The aperture of a pixel, or any other display region, is the area of the pixel that outputs light. In general, the aperture of a pixel is reduced by row and column cuts that are used to electrically isolate rows and columns of sub-pixels, or sub-regions. These row and column cuts do not generally output light, so the cuts correspond to "dead areas" on the pixel. Accordingly, as the number of sub-regions in a pixel increases, the dead areas of the pixel also increase, thereby decreasing the aperture of the pixel. Thus, by dividing a pixel into sub-pixels to increase the resolution of the pixel, the aperture of the pixel is reduced due to these dead areas. Accordingly, improved systems and methods for increasing a resolution of a pixel with a reduced effect on the aperture of the pixel are desired.

As the number of leads connecting a pixel to the device driver increases (e.g., due to dividing the pixel into separately actuatable sub-pixels), the complexity of routing the leads also increases. In addition, as the number of leads routed to a pixel increases, the complexity of attaching the driver to the display increases, and additional drivers that handle additional leads may also be necessary. Thus, as the number of leads increases, the complexity and cost of interconnecting the leads to the pixel also increase. Accordingly, when designing a pixel, there is typically a tradeoff between the available bit depth and the cost, complexity, and aperture of the pixel.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In certain embodiments, a pixel having a bit depth per color comprises a plurality of substantially equally sized sub-regions having a first group of sub-regions and a second group of sub-regions. Each of the sub-regions of the first group includes a first number of display elements per color and each of the sub-regions of the second group includes a second number of display elements per color. The second number minus the first number is substantially equal to two raised to a power that is less than the bit depth per color.

In certain embodiments, a pixel having a bit depth comprises a plurality of substantially equally sized display elements each having an "on" position and an "off" position. The display elements each emit visible light when in the "on" position. The plurality of substantially equally sized display elements includes a first group of display elements and a second group of display elements. The display elements of the first group each have an intensity of a predetermined value when in the "on" position and the display elements of the second group each have an intensity of a fraction of the predetermined value when in the "on" position. An intensity of the pixel is equal to an intensity of each of the plurality of display elements in the "on" position.

In certain embodiments, a pixel having a bit depth n per color comprises a first number N of sub-regions, each sub-region having c display elements per color. Each display element has a first area. The pixel further comprises a second number M of sub-regions, each sub-region having $c+2^{(n-p)}$ display elements per color. Each of (c−1) of the $c+2^{(n-p)}$ display elements has a second area and each of $1+2^{(n-p)}$ of the $c+2^{(n-p)}$ display elements has a third area. The first area and the second area are substantially equal and the third area is substantially equal to the first area divided by $1+2^{(n-p)}$, wherein p is less than n.

In certain embodiments, a method of arranging a plurality of display elements in a pixel comprises dividing the pixel into a first group of sub-regions and a second group of sub-regions. The sub-regions in the first and second groups have substantially equal areas. The method further comprises allocating a first number of display elements per color to each of the sub-regions of the first group. The method further comprises allocating a second number of display elements per color to each of the sub-regions of the second group. The second number minus the first number is substantially equal to two raised to a power that is less than a bit depth per color of the pixel.

In certain embodiments, a display device responsive to signals having a plurality of bits comprises a plurality of pixels, each of the pixels comprising a plurality of sub-regions. The display device further comprises a first plurality of sub-regions, each sub-region having a first area. The first plurality of sub-regions is responsive to a first portion of the plurality of bits. The display device further comprises a second plurality of sub-regions, each sub-region having a second area. The second area is less than the first area. The second plurality of sub-regions is responsive to a second portion of the plurality of bits, wherein the bits of the second portion are less significant than the bits of the first portion.

BRIEF DESCRIPTION OF THE DRAWINGS

FIG. 7 is a diagram schematically illustrating one embodiment of a pixel including multiple sub-regions.

FIG. 8 is a diagram schematically illustrating an exemplary sub-region of FIG. 7, the sub-region having a staggered RGB structure.

FIG. 9 is a diagram schematically illustrating another exemplary sub-region of FIG. 7, the sub-region having a striped RGB structure.

FIG. 10 is a diagram schematically illustrating another embodiment of a pixel comprising an 18×18 array of sub-regions.

FIG. 11A is a close-up view schematically depicting one embodiment of one sub-region of the pixel illustrated in FIG. 10.

FIG. 11B is a close-up view schematically depicting one embodiment of one further subdivided sub-region of the pixel illustrated in FIG. 10.

DETAILED DESCRIPTION OF CERTAIN EMBODIMENTS

A bit depth of a pixel comprising multiple display elements, such as interferometric modulators, may be increased through the use of display elements having different intensities, while the lead count is minimally increased. An exemplary pixel with a single display element having an intensity of 0.5 and N display elements each having an intensity of one can provide about 2N+1 shades (e.g., 0, 0.5, 1.0, 1.5, 2.0, [N+0.5]). In comparison, a pixel having N display elements, each having an intensity of one, can only provide about N+1 shades (e.g., 0, 1, 2, . . . , N). Thus, using at least one display element having an intensity lower than the intensity of each of the other display elements increases the number of shades provided by the pixel by an approximate factor of two and increases the bit depth of the pixel, while minimizing the number of additional leads.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
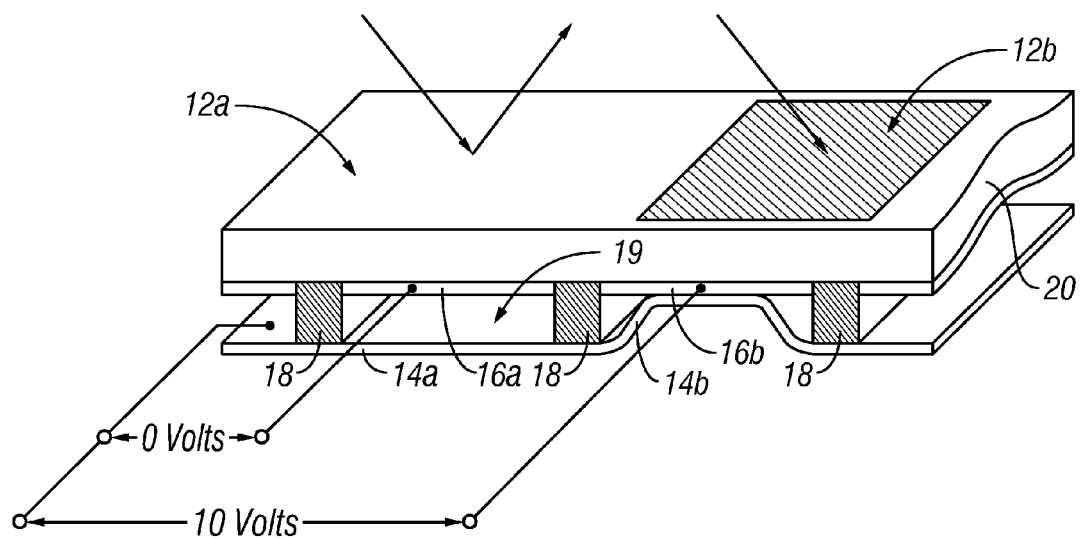
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
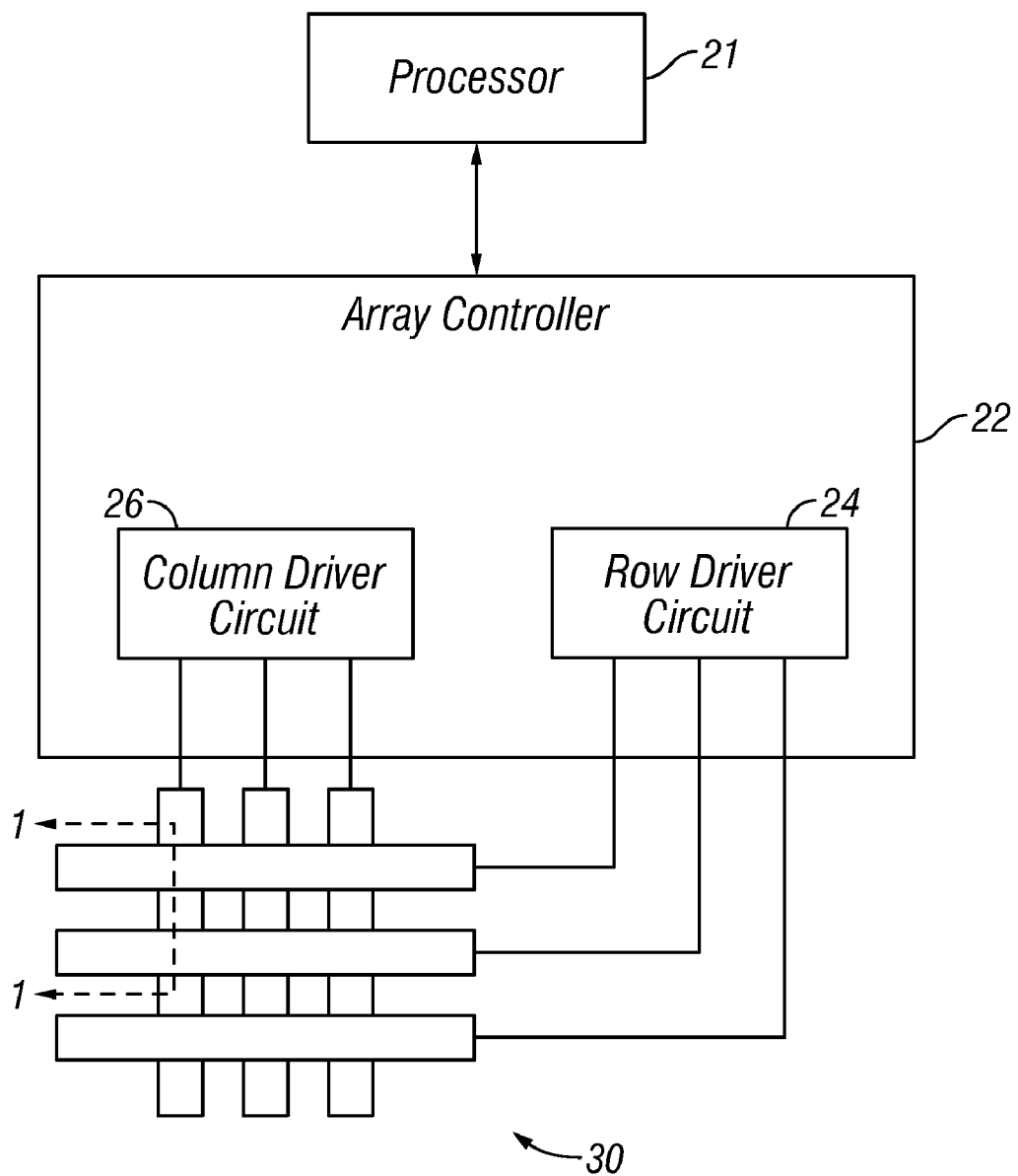
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium®Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
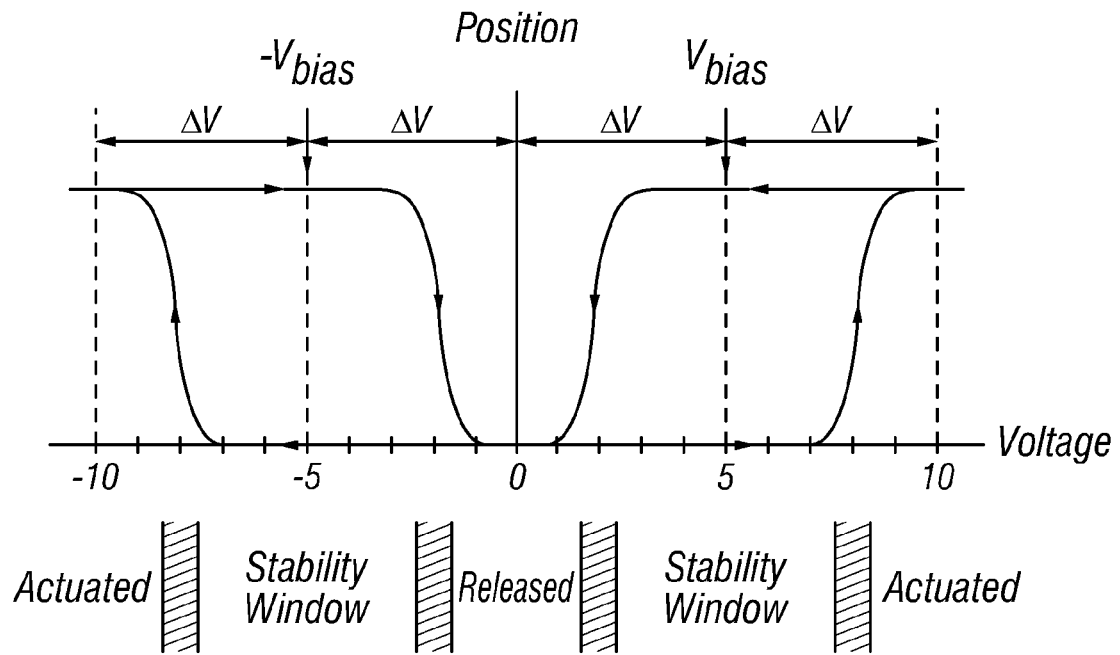
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
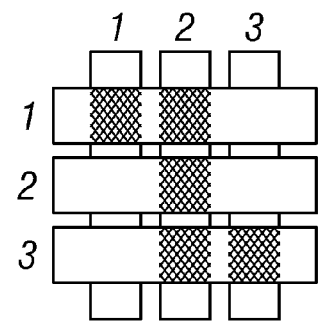
FIGS. 5A and 5B illustrate one exemplary timing diagram for row and column signals that may be used to write a frame of display data to the 3×3 interferometric modulator display of FIG. 2.
Figure 5B:
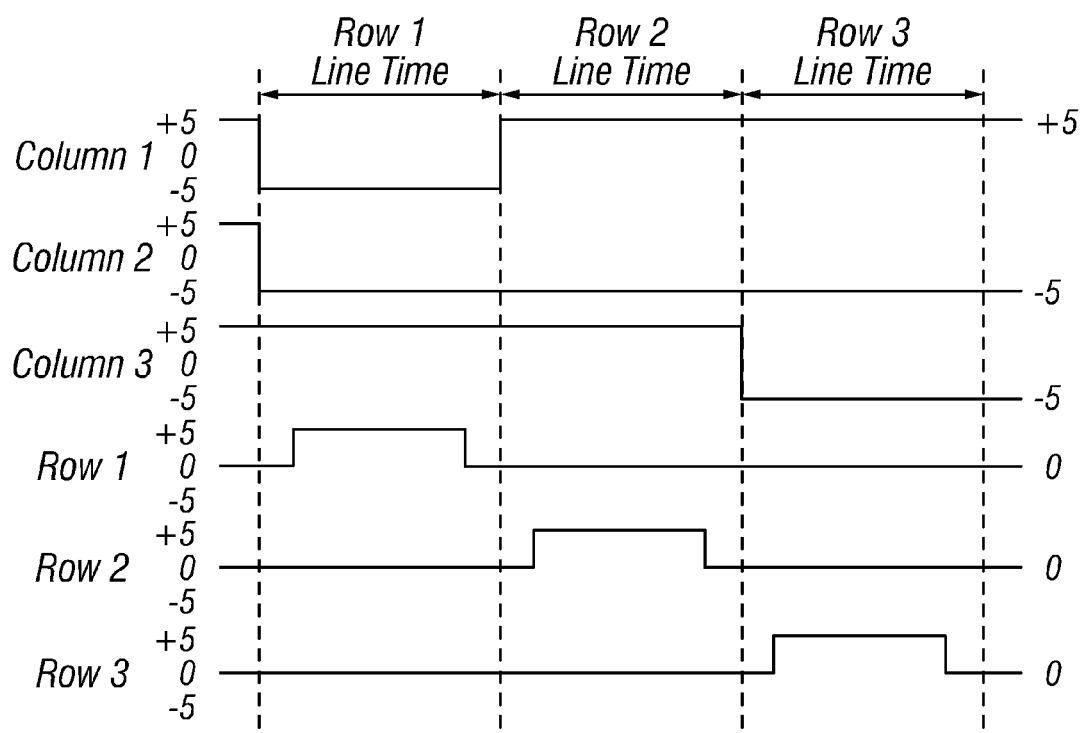

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
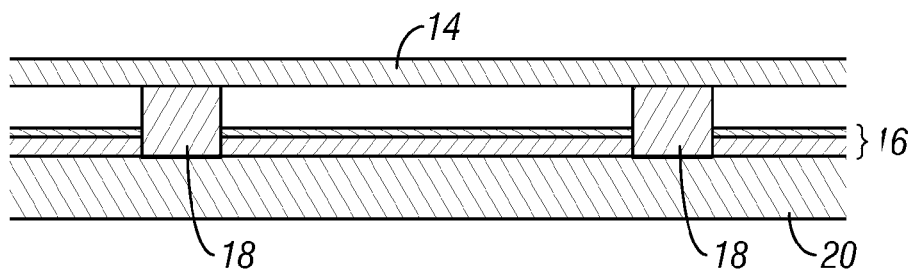
FIG. 6A is a cross section of the device of FIG. 1.
Figure 6B:
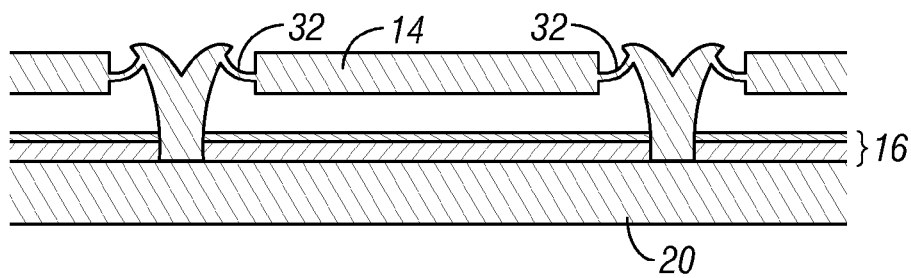
FIG. 6B is a cross section of an alternative embodiment of an interferometric modulator.
Figure 6C:
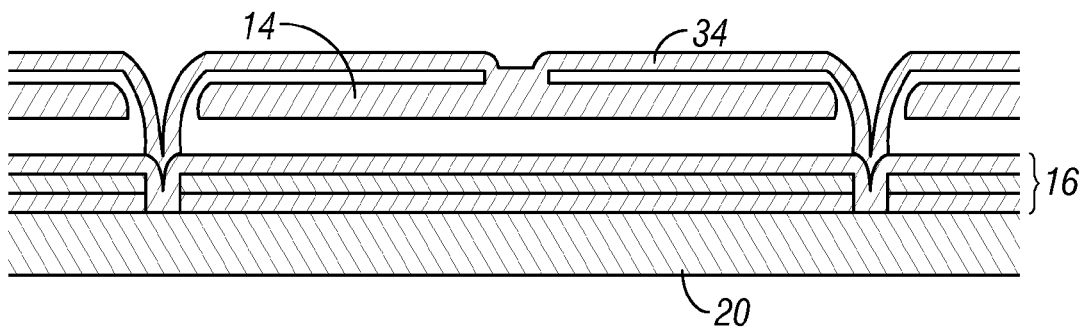
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published application 2004/0051929. A wide variety of well known techniques may be used to produce the above described structures involving a series of material deposition, patterning, and etching steps.

As described above, a display device comprises multiple pixels, or other display regions, that are configured to activate according to a received driver signal. The pixels of the display devices may respond linearly or non-linearly to the driver signal. For example, for a linear black-and-white display, a change of the grey-scale shade of a pixel is directly proportional to the change in the driver signal applied to the pixel. Thus, a pixel of a linear display undergoes uniform shade changes at both ends of its output spectrum. In certain such embodiments, creating a viewer-detectable change in the brighter portion of the output spectrum of the pixel may require a larger change in the driver signal than that required to create a viewer-detectable change in the darker shades of the same display. In contrast, the shades of a pixel in a non-linear display may change non-proportionally, such as exponentially, to a change in the corresponding driver signal.

Pixels of the display have an associated bit depth, where the bit depth defines the number of different colors, or shades of a color, that the pixels are configured to display. The term "bit depth" as used herein refers generally to either a linear or non-linear bit depth. A pixel having a linear bit depth undergoes substantially uniform changes in shade or color in response to corresponding changes of the driver signal. A pixel having a non-linear bit depth undergoes non-uniform changes in shade or color in response to corresponding changes of the driver signal. For example, in response to equivalent changes in the driver signal, a pixel having a non-linear bit depth may make larger shade changes for brighter shades while making smaller shade changes for darker shades.

In certain embodiments, the number of shades of a color that a pixel is capable of displaying is expressed as a total bit depth of the pixel, where the number of shades is substantially equal to two raised to the power of the total bit depth. Accordingly, a pixel having a total bit depth of six is capable of displaying approximately $2^6=64$ shades. Grayscale and color displays are typically characterized by this total bit depth, which is referenced herein as "n." Thus, each pixel in an eight-bit grayscale display (n=8) may depict approximately $2^8=256$ shades of gray and each pixel in a 13-bit color display (n=13) can depict approximately $2^{13}=8192$ shades per color.

Each of the color pixels of a display typically comprises sub-regions, or sub-pixels, that each output light of one of three colors (e.g., red, green, or blue). Other colors are produced by varying the intensity of each of the color sub-regions. For example, a color computer monitor typically comprises a 24-bit display with 24 bits per pixel. The 24-bit display typically allocates 8 bits for each of the three primary colors, for a total of over approximately 16 million possible color shades (i.e., $2^{24}$ or 16,777,216 possible color shades).

The description and claims that follow generally describe pixels and sub-regions. A pixel is used herein as an exemplary display region and those of skill in the art will recognize that any reference to a pixel may also be applied to other display regions, such as portions of a pixel or multiple pixels, for example. Each pixel may include multiple sub-regions or sub-pixels. Furthermore, each sub-region may comprise multiple display elements, which, as used herein, are generally defined as the smallest elements of the display that are capable of changing an intensity. Thus, pixels and sub-regions of pixels may each comprise multiple display elements, each of which has a corresponding element bit depth corresponding to the number of shades per color generated by the display element.

Display elements compatible with certain embodiments disclosed herein include, but are not limited to, element bit depths of one (e.g., each display element changes between two states, such as black and white or on and off). In certain other embodiments, the display elements have an element bit depth of two or more (e.g., each display element is capable of providing multiple shades of a single color or multiple colors). Other embodiments comprise mixtures of display elements with different element bit depths, resulting in various total bit depths for displays.

Displays typically receive a driver signal from a display signal source. This display signal source may, depending on the embodiment, provide an analog or digital driver signal. In certain types of displays, each pixel (or sub-region) includes a single display element that can emit or reflect a nearly continuous range of light intensities. In such types of displays, each sub-region includes a single display element that can be driven by a driver signal that varies relative to each of the gray or color shades. Exemplary displays that have individual display elements that can produce a varying output include, but are not limited to, cathode ray tubes (CRT) displays and liquid crystal displays (LCDs).

One consideration in designing a display is the number of signal leads needed to connect a display signal source to each display element of the display. CRT displays steer an electron beam of varying intensity sequentially to each display element, thus CRT displays do not have leads for each display element. LCDs typically receive the driver signal using a separate lead for each grayscale pixel, or for each group of display elements per color in a sub-region. Accordingly, if an LCD pixel comprises multiple rows and columns of display elements, the pixel requires multiple leads for driving the multiple display elements in the pixel.

In some displays, each display element operates in a binary, or on/off mode. The output of each display element thus has a bit depth of one. One such display element is an interferometric modulator, discussed in more detail above. In certain embodiments, the display elements of the display are sized to be sufficiently small to prevent the human eye, at normal viewing distances, from resolving the shape of the display elements. Thus, certain such embodiments advantageously avoid visually distracting artifacts.

In certain embodiments, a display comprising a plurality of display elements (each having an element bit depth) may be configured to provide a higher total bit depth by dividing each pixel into sub-regions that each includes a set of display elements. In certain embodiments, the display elements within a sub-region of a pixel have substantially identical sizes and the intensity of each sub-region is determined by the number of display elements that are in their "on" state. In certain other embodiments, the display elements within a sub-region vary in size. In certain such embodiments, each sub-region comprises a plurality of display elements having areas that vary in proportion to one another, so that the intensity of each sub-region is determined by the area of the "on" display elements. For example, a sub-region of certain embodiments comprises four display elements with the area of a second display element approximately twice the area of a first display element, a third display element having an area of approximately twice that of the second display element, and a fourth display element having an area of approximately twice that of the third display element. In such embodiments, the sub-region has a bit depth of four (i.e., $2^4$ shades can be produced).

To drive a pixel having sub-regions comprising binary display elements, signal leads are used to drive each of the sub-regions of the pixel. The number of signal leads for such a pixel architecture can be generally characterized mathematically for any type of display region, whether the display elements are liquid crystal display elements, interferometric modulators, or any other type of optical switch. More particularly, a typical pixel requires one lead for each row of display elements and one lead for each column of display elements. Thus, an exemplary pixel which includes 3 rows and 4 columns of sub-regions, with each sub-region comprising a single display element, is driven by 7 leads. If each of the sub-regions includes multiple display elements, the number of leads is increased. For example, for an exemplary embodiment having 3 rows and 4 columns of sub-regions, in which each sub-region comprises two rows of three display elements (e.g., red, green, and blue display elements), the number of leads is increased to 18, including 6 row leads (3 rows of sub-regions each having 2 rows of display elements) and 12 column leads (4 columns of sub-regions each having 3 columns of display elements). More generally, for a pixel having x rows of sub-regions and y columns of sub-regions, with each sub-region comprising w rows of display elements and z columns of display elements, the number of leads per pixel is equal to:

$$(x \cdot w) + (y \cdot z) \quad \text{(Eqn. 1)}$$

In certain embodiments, the number of display elements per row and column of a sub-region are equal to one another (i.e., z=w). For certain such embodiments, each sub-region comprises one or more display elements corresponding to each of three colors (e.g., red, green, and blue). For example, a 3×3 sub-region can comprise three red display elements, three green display elements, and three blue display elements.

For an exemplary pixel comprising x rows of sub-regions and y columns of sub-regions, with each sub-region including c colors of display elements (e.g., c=3 with red, green, and blue display elements) arranged as c rows of color display elements and c columns of display elements, the number of leads for the pixel is equal to $(x+y) \cdot c$. While the embodiments disclosed herein are generally described with c=3, those of skill in the art will recognize that the systems and methods described herein are equally applicable for any other selected value of c, such as 1, 2, 4, 5, 6, 7, 8, 9, 10, or 20, for example. The number of available shades provided by the pixel is equal to:

$$x \cdot y \cdot c + 1 \quad \text{(Eqn. 2)}$$

which is generally related to the total bit depth per color of the pixel by:

$$x \cdot y \cdot c + 1 \approx 2^n \quad \text{(Eqn. 3)}$$

where n is the total bit depth per color of the pixel. As used herein, the equality of Eqn. 3 is approximate, such that the total bit depth per color is the lowest power of two which yields a number of shades equal to or greater than $x \cdot y \cdot c + 1$.

FIG. 7 schematically illustrates an exemplary architecture of a pixel 1100 of a 13-bit color display formed by a 52×52 array of sub-regions 1110. Each sub-region 1110 may include one or more display elements 1120, such as multiple display elements 1120 for outputting each of a set of colors (e.g., red, green, and blue). FIGS. 8 and 9 schematically depict two alternative configurations of a color sub-region 1110 of FIG. 7 in which each sub-region 1110 includes three display elements 1120 for each of three colors. Thus, with each of the 52×52 sub-regions 1110 having three display elements 1120 per color (e.g., three red display elements, three green display elements, and three blue display elements), each display element having an element bit depth of one, the pixel 1100 can produce $52^2 \cdot 3 + 1 = 8113$ shades per color (i.e., 8113 shades of red, 8113 shades of green, and 8113 shades of blue), which is substantially equivalent to a total bit depth per color of 13 ($2^{13} = 8192$ shades per color).

The sub-region 1110 illustrated in FIG. 8 has a staggered structure for its display elements 1120. In the staggered structure, the display elements 1120 for each color are staggered along the rows and columns (e.g., the first row is red-green-blue, the second row is blue-red-green, and the third row is green-blue-red). FIG. 9 schematically depicts another configuration of the color sub-region 1110 in the pixel 100 of FIG. 7. In the configuration of FIG. 9, the sub-region 1110 has a striped structure for its display elements 1120, wherein the red, green, and blue display elements 1120 are arranged with display elements of the same color arranged in rows, forming color stripes along the rows. Alternatively, a striped structure is also formed by arranging the red, green, and blue display elements 1120 with display elements of the same color arranged in columns, forming color stripes along the columns.

In certain embodiments, the conductive leads of the striped layout of display elements 1120 illustrated in FIG. 9 has less complexity than the conductive leads of the display element 1120 illustrated in FIG. 8 having the staggered configuration. However, the staggered layout of display elements 1120 advantageously spreads the output light for each color more evenly across the area of the sub-region 1110. For larger sub-region areas, this feature of the staggered layout can reduce visual artifacts associated with non-point-like sub-regions, as compared to the striped configurations.

As discussed briefly above, the exemplary pixel 1100 of FIGS. 7, 8, and 9 may be characterized as follows:
total bit depth n=13
number of display elements per color per sub-region c=3
number of rows (equal to number of columns) m=52
shades per color per pixel=$m^2 \cdot c + 1 = 52^2 \cdot 3 + 1 = 8113$, or approximately $2^{13}$; and
leads per pixel=$m \cdot c \cdot 2 = 52 \cdot 3 \cdot 2 = 312$ Thus, for a display comprising a 4×3 array of such pixels 1100, the lead count would be $(4+3) \cdot 312 = 2184$ leads per color. In general, as the number of leads for a display increases, the cost of attaching a driver to the display increases and the cost of the driver itself may also increase.

In some applications, displays are characterized by the aperture of pixels. A smaller aperture is typically associated with lower brightness and lower contrast of the display. The aperture of the pixel 1100 is reduced by "dead areas" associated with row and column cuts which do not output light. Fewer leads advantageously decrease the number of cuts or the areas of the cuts on the pixel. Accordingly, there is a need for improved systems and methods providing a desired total bit depth of a pixel while reducing the number of leads required to drive the pixel.

The display driver signal of certain embodiments is a digital signal comprising a number of bits which are divided into most significant bits and less significant bits. In certain embodiments, the most significant bits are used to drive larger-area display elements, thus providing brighter output levels and coarser gradation of shade using fewer display elements. In certain embodiments, dimmer output levels and finer gradations of shade can be provided by driving smaller-area display elements using the least significant bits of the display driver signal. These smaller display elements, in certain embodiments, are aggregated along a smaller number of rows or columns to minimize the required number of leads for these display elements.

In certain embodiments, the pixel comprises multiple display elements that are equally sized and each of the display elements has an equal intensity $I_{de}$. For a pixel that is capable of displaying 8193 shades, e.g., having a bit depth of 13, the pixel of certain embodiments is configured to display shades from 0 to $8192 \cdot I_{de}$. As used herein, the intensity $I_{de}$ is a reference intensity which is used to describe the intensities of the display elements of a pixel. Thus, $I_{de}$ may vary from one pixel to another, or from one display to another.

In certain such embodiments, the overall intensity or shade of the pixel can be varied in multiples of $I_{de}$ between 0 to $8192 \cdot I_{de}$ by turning on a corresponding number of the equally-sized display elements. In such embodiments, the intensity or shade of the pixel is incrementable in units of $I_{de}$. In such embodiments, because each display element provides an intensity of $I_{de}$, the 8192 display elements provide the 8193 different shades of the pixel.

Typically, to increase the bit depth of a pixel, additional display elements are added, thereby allowing more shades. For example, with binary display elements, each additional display element may increase the number of shades available from the pixel by one. As additional display elements are added, however, the number of leads needed to drive the pixel increases. Adding a display element for each additional desired shade quickly increases the number of display elements and the number of leads needed to drive the pixel.

According to certain embodiments of the systems and methods described herein, a bit depth of a pixel may be increased through the use of display elements having different intensities, while the lead count is minimally increased. For example, a pixel may comprise a plurality of display elements each having an intensity of $I_{de}=1$ and one or more display elements each having an intensity of one-half. An exemplary pixel with a single display element having an intensity of 0.5 and 8191 display elements each having an intensity of one can provide 16,384 shades (e.g., 0, 0.5, 1.0, 1.5, 2.0, 2.5, 3.0, . . . 8,191.5). In comparison, a pixel having 8,192 display elements, each having an intensity of one, can only provide 8,193 shades (e.g., 0, 1, 2, . . . , 8,192). Thus, using a single smaller display element increases the number of shades provided by the pixel by an approximate factor of two, and increases the bit depth of the pixel from 13 ($2^{13}$=8,192) to 14 ($2^{14}$=16,384).

In other embodiments, the pixel comprises other combinations of display elements having other intensities. Another exemplary pixel may comprise a plurality of display elements each having an intensity of 1, and one or more display elements each having respective intensities of 0.2, 0.4, 0.6, and 0.8. As described in detail below, by including one or more lower-intensity display elements in a pixel, a fractional intensity may be achieved and, thus, the total bit depth for the pixel is increased through the use of these lower-intensity display elements. Accordingly, a total bit depth of a display may be increased by decreasing the aperture of one or more display elements of the pixel.

In certain embodiments, display elements with a smaller size have a smaller aperture than the other display elements provide more gradations of the shadings that can be generated by the pixel. For example, one or more display elements of a pixel may be manufactured to have an aperture that is a preselected fraction of the aperture of the other display elements. In this way, the smaller-aperture display element provides fractional shades that would not be available with only the larger-aperture display elements.

In another embodiment, display elements having smaller apertures are formed by masking at least a portion of one or more of the larger display elements to decrease the aperture of these display elements. In one embodiment, a mask, sometimes referred to as a "black mask" is made of black organic material, black mask chrome or a dielectric stack. In either of the above cases, including display elements with intensities lower than the intensities of the other display elements advantageously increases the total bit depth of the pixel while only slightly increasing the number of leads used to drive the pixel. The following description provides exemplary systems and methods for increasing a bit depth of a pixel through the use of display elements that each have an intensity smaller than other display elements of the pixel.

Figures 10, 11A, 11B:
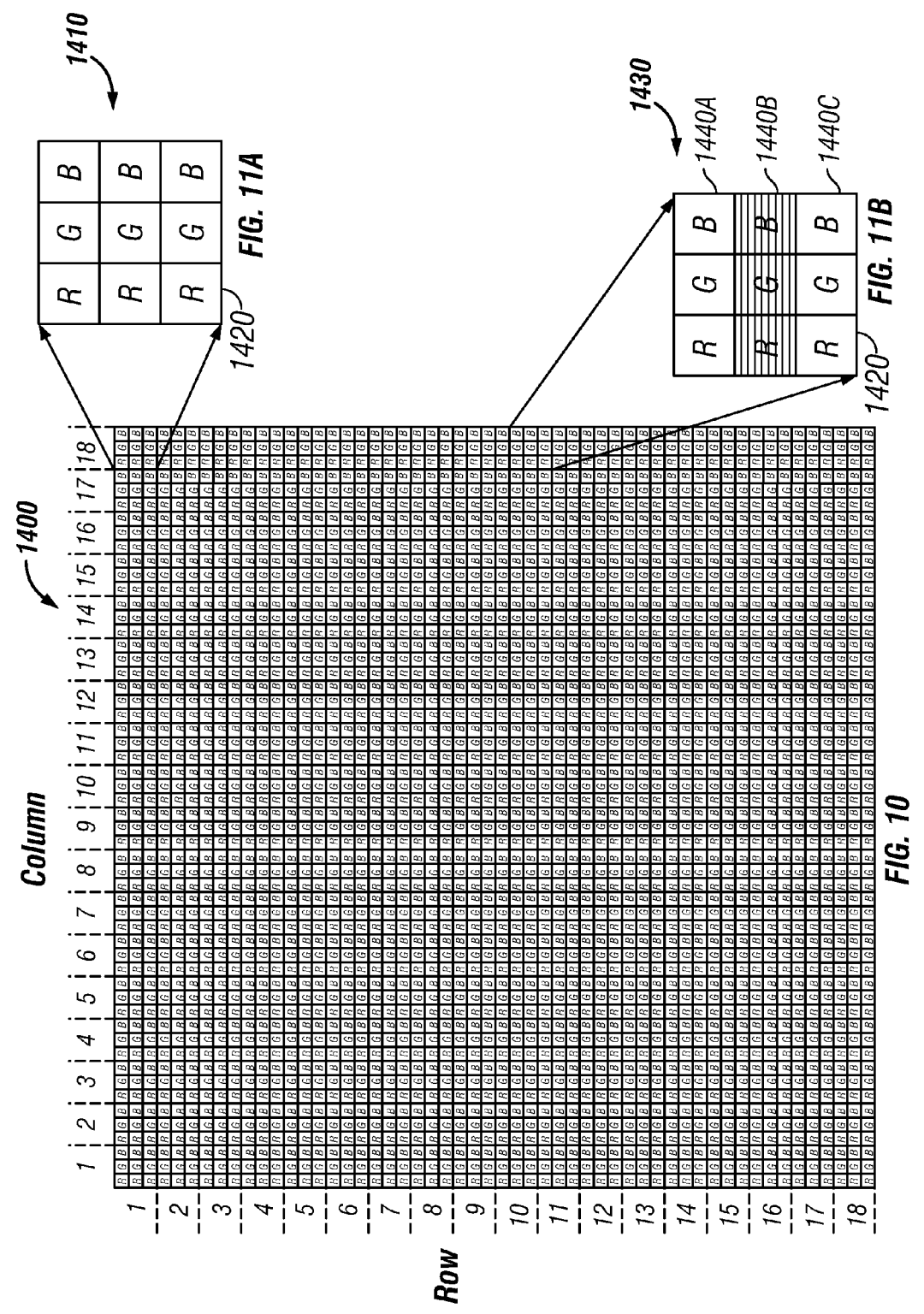

FIGS. 10, 11A, and 11B are diagrams illustrating an exemplary improved configuration of a pixel 1400. The term "total bit depth," as used herein refers to a bit depth of an entire pixel, such as pixel 1400, while the term "element bit depth" refers to the bit depth of a single display element, such as display elements 1420. The pixel 1400 comprises a plurality of substantially equally sized sub-regions having a first group of sub-regions 1410 and a second group of sub-regions 1430. Each of the sub-regions 1410 of the first group includes a first number of display elements 1420 per color. Each of the sub-regions 1430 of the second group includes a second number of display elements 1440 per color. The second number minus the first number is substantially equal to two raised to a power that is less than the total bit depth per color.

More particularly, FIG. 10 schematically illustrates a pixel 1400 comprising an 18×18 array of sub-regions which include 18×17=306 sub-regions 1410 schematically illustrated in FIG. 11A, and 18 sub-regions 1430 schematically illustrated in FIG. 11B. Although the pixel 1400 has significantly fewer sub-regions than does the pixel 100 schematically illustrated by FIG. 7, both the pixel 1100 of FIG. 7 and the pixel 1400 of FIG. 10 provide a total bit depth per color of 13 (n=13). However, the pixel 1400 includes a reduced number of sub-regions compared to the pixel 1100 and, thus, fewer leads are needed to drive the pixel 1400. Accordingly, the pixel 1400 provides the same total bit depth as the pixel 1100 with fewer leads and, thus, reduced loss in aperture when compared to the pixel 1100.

In the exemplary pixel 1400, each sub-region 1410 comprises c display elements 1420 per color. For example, as shown in FIG. 11A, the sub-region 1410 comprises c=3 red display elements, c=3 green display elements, and c=3 blue display elements. The sub-regions 1410 are arranged in 17 rows in FIG. 10, but their configurations are also compatible with other embodiments described herein. In general, an array of 18×18 sub-regions 1410 would be able to provide (18×18×3)+1=973 shades per color, which corresponds to a total bit depth per color of 10 ($2^{10}$=1024 shades per color).

In order to achieve a total bit depth that is greater than 10 from the above-introduced 18×18 array of sub-regions, additional shades must be made available. For example, in order to achieve a total bit depth of 13 in the pixel 1400, $2^{13}/2^{10}$=8 additional color shades are needed. In certain embodiments, these additional shades are provided by one or more sub-regions 1430, which replace corresponding sub-regions 1410. In FIG. 10, for example, the pixel 1400 is divided into 18 rows and 18 columns (m=18) of sub-regions, where 17 rows contain sub-regions 1410 and one row contains sub-regions 1430.

In the exemplary pixel 1400, the sub-regions 1430 are each divided into 11 display elements. More particularly, the 18 sub-regions 1430 each include two rows of display elements 1440*a* that are the same size as the display elements 1420, and 9 rows of display elements 1440*b* that are smaller than the display elements 1420. Thus, each of the sub-regions 1430 has 8 more display elements per color than does each of the sub-regions 1410. In the embodiment of FIG. 11B, the display elements 1440*b* are ⅛ the size of the display elements 1440*a*, 1420. Accordingly, the display elements 1440*b* each have an intensity that is fractional that of the display elements 1440*a*, 1420. These smaller display elements 1440*b* provide 8 additional shades in between each of the shades that are available without the smaller display elements 1440*b*. Thus, by adding these additional smaller display elements 1440*b*, the number of shades provided by the pixel is increased by a factor of 8. Although the display elements 1440*b* illustrated in FIG. 10 are formed along a single row of the pixel 1400, in other embodiments the display elements 1440*b* may be dispersed throughout the pixel 1400.

In embodiments where the pixel 1100 and the pixel 1400 are substantially equally sized, the display elements 1420 of FIG. 11A and 11B are larger than the display elements 1120 of FIGS. 8 and 9, and thus fewer in number. For example, in the embodiment of FIG. 10, the sub-regions 1410 are approximately 8 times larger than the sub-regions 1110 of FIG. 7 (e.g., pixel 1110 includes $52^2$=2,704 sub-regions while pixel 1410 includes $18^2$=324 sub-regions, so that sub-regions of the pixel 1410 are larger by a factor of 2,704/324=8.34). To display the most significant bit of the display driver signal in pixel 1400 thus requires activation of 162 ($18^2/2$) sub-regions 1410 while display of the most significant bit of the display driver signal in pixel 1100 requires activation of 1352 ($52^2/2$) sub-regions 1110. This reduction in the number of sub-regions needed to produce the shades associated with the most significant bit of the display driver signal results in a corresponding reduction in the required number of leads. Accordingly, the pixel 1400 has fewer leads than pixel 1100, while providing substantially the same bit depth per color.

In certain embodiments, as schematically illustrated by FIG. 10, the pixel 1400 is subdivided into sub-regions configured in an equal number of rows and columns m. In the embodiment of FIG. 10, pixel 1400 is sub-divided into sub-regions in accordance with the following equation:

$$m^2 \cdot c + 1 = 2^p,$$ (Eqn. 4)

where p is a total bit depth lower than the desired total bit depth, n, e.g., p<n. In one embodiment, p represents a bit depth of a pixel having substantially $m^2$ equally sized display elements. Thus, in FIG. 7, for example, p=n. As will be discussed hereinafter, a total bit depth of a pixel having substantially equally sized display elements may be increased from p to n by further subdividing one or more display elements into smaller additional display elements. These smaller display elements may increase the total bit depth of the pixel by providing linear and/or non-linear increments between shades available by the larger display elements.

In one embodiment, the value of p may be selected such that each of the individual red, green, and blue display elements 1420 are distributed with a spatial frequency that tends not to be visible to the eye for a given set of viewing conditions and the dynamic range of the display. In another embodiment, p may be selected according to a number of leads that the pixel is configured to handle, which may be determined by factors of cost and/or the size of the pixel, for example. Thus, the value of p may vary from one application to another. In an exemplary embodiment discussed herein, p=8. However, p may be any other value, such as 2, 3, 4, 5, 6, 7, 8, so long as p is less than n.

As noted above, the smaller display elements 1440*b* produce $2^{n-p}$ increments between adjacent shades so that the total number of shades in the pixel 1400 is $2^p \cdot 2^{n-p} = 2^n$, providing a total bit depth of n.

Although exemplary pixel 1400 includes an entire row of sub-regions 1430, in other embodiments different amounts of sub-regions may be included in a pixel and the sub-regions 1430 can be dispersed throughout the pixel. In addition, depending on the values of p and n, the number of additional divisions necessary to achieve the total bit depth n may be adjusted.

In certain embodiments having one or more sub-regions 1430, including display elements 1440*b*, and multiple sub-regions 1410, including display elements 1420, the number of leads per pixel 1400 can be expressed as:

$$[m \cdot c \cdot 2] + 2^{n-p}$$ (Eqn. 5)

In other words, the number of leads for the pixel 1400 is equal to the number leads used in a pixel having a bit depth of p, plus the $2^{n-p}$ extra leads necessary to drive the display elements 1440*b*. In the exemplary embodiment of FIG. 10, the number of leads is $[18 \cdot 3 \cdot 2] + 2^{(13-10)} = 116$. For comparison, the pixel 1100 depicted in FIG. 7 included 312 leads to achieve the same 13 bit color depth.

In other embodiments, sub-regions can be divided unequally to form display elements 1440*b* that are non-linearly sized, thus providing different levels of color change depending on the size of the display elements 1440*b* that are activated. In such embodiments, the display elements 1440*b* may be used to approximate a certain display response profile, such as is typically referred to as gamma.

In other embodiments, the smaller display elements, such as display elements 1440*b*, may be formed in other manners than discussed above with reference to FIGS. 10 and 11B. For example, the aperture of one or more display elements may be decreased using a black mask or other suitable methods as would be apparent to one of skill in the art, to form the smaller linear or non-linear display elements. In one embodiment, the aperture of $2^{n-p}$ display elements may be decreased in order to achieve a desired total bit depth. In this embodiment, the number of display elements with a decreased aperture is only a small fraction of the total number of display elements and, thus, the decrease in the total aperture of the pixel is generally not significant.

Figure 12:
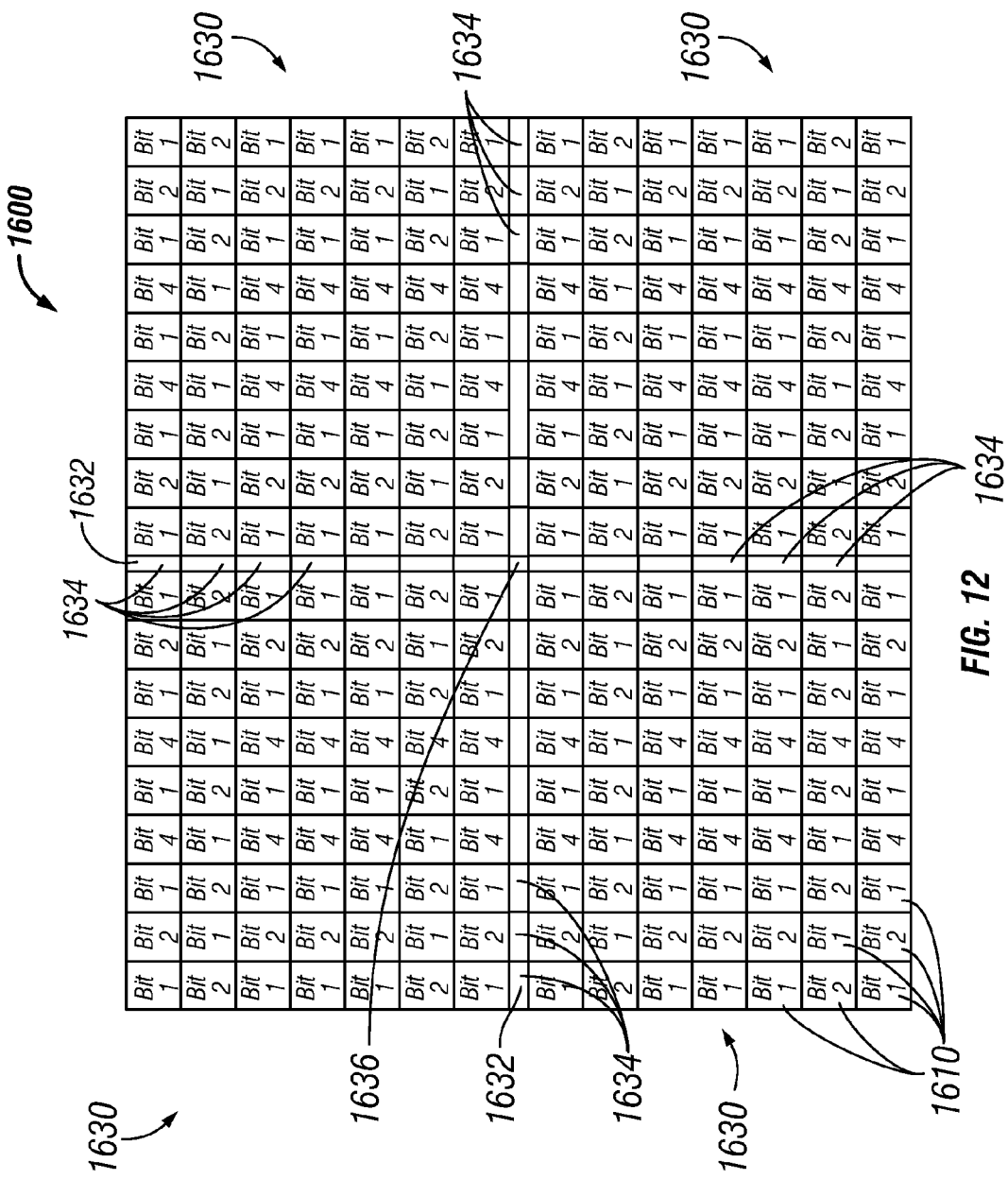
FIG. 12 schematically illustrates another embodiment of a sub-region structure of a pixel having a reduced number of leads.

FIG. 12 is a diagram illustrating another exemplary sub-region architecture that may be implemented to achieve a desired total bit depth with a reduced number of leads. In the embodiment of FIG. 12, a pixel 1600 is divided into an array of sub-regions 1610 that correspond to the most significant bits of the drive signal, e.g., those that cover a substantial portion of the total aperture of the pixel 1600. In certain embodiments, the array of sub-regions 1610 covers more than about 90% of the total aperture of the pixel 1600. In certain other embodiments, the array of sub-regions 1610 covers more than about 98% of the total aperture of the pixel 1600. In certain other embodiments, the fraction of the total aperture of the pixel 1600 covered by the array of sub-regions 1610 is in a range between approximately 85% and approximately 100%. As described below, these sub-regions 1610 are distributed such that there is generally very small loss of aperture corresponding to these significant signal bits. The remaining portion, or less significant bits, of the drive signal are used to drive smaller display elements 1636. Because of the reduced size of the display elements 1636, more leads for a given area of display elements 1636 are necessary than for an equally sized area of the larger sub-regions 1610. Accordingly, the display elements 1636 generally exhibit a greater percentage loss of aperture associated with these less significant portions of the signal. As these less significant bits of the display signal are associated with a much smaller portion of the aperture of the pixel 1100 (less than 10%, for example), this loss is insignificant. In one embodiment, the pixel 1600 is subdivided into sub-regions according to the formula:

$$N \cdot M = 2^{K+2} - 4 \tag{Eqn. 6}$$

where integer N is the number of sub-regions 1610 in a row of the pixel 1600, integer M is the number of sub-regions 1610 in a column of the pixel 1600, and integer K is the number of bits of the signal that are designated as "significant bits." These K bits of the drive signal drive the display elements that are considered most significant in the pixel 1600, which are typically the larger display elements that generate the most frequently used shades or colors. The remaining bits of the drive signal drive display elements are fit into a remaining portion of the pixel 1600. The display elements in this remaining portion may be sized by reducing their effective aperture. In this way, these smaller aperture display elements can represent the proper binary weights and, because of their relatively small apertures, the area they consume is relatively inconsequential. In one embodiment, the display elements driven by the less significant bits are disposed in a cross shape area that divides the pixel into quadrants as schematically illustrated by FIG. 12.

In the pixel 100 of FIG. 7, for example, the most significant bit of the display driver signal may correspond to switching half of the equal sized sub-regions 1110. The switching of half of the sub-regions 1110 of a simple binary grid requires a signal from a corresponding half of the leads in such a pixel architecture. Thus, reducing the number of sub-regions associated with the most significant bits of the display driver signal can allow the number of leads to be reduced. Some pixel architectures use sub-regions having a geometrically increasing area to produce the output from the least to most significant bit of the control signal. This architecture can reduce lead count substantially. However, as discussed above, the large sub-regions in such displays may create display artifacts in large area displays, e.g., where the large sub-regions are visible within the pixel to a viewer.

In the exemplary embodiment of FIG. 12, the pixel 1600 provides a total bit depth of 13, while reducing the number of leads for the display driver signal from that discussed above with respect to the 13-bit pixel 1100. To achieve a total bit depth of 13, the driver signal comprises 13 bits, including some significant bits and some less significant bits. The exemplary pixel 1600 is divided such that N=18, M=14, and K=6, so that the pixel includes 252 (18·14=252) sub-regions 1610 and the driver signal includes 6 significant bits and 7 less significant bits. Those of skill in the art will recognize that this number of rows and columns is exemplary and that in other embodiments the number of rows and columns may vary as discussed above. Of the 252 sub-regions 1610 in this embodiment, 128 sub-regions (labeled "Bit 1") are configured to be activated by the most significant bit of the driver signal, 64 sub-regions (labeled "Bit 2") are configured to be activated by the second most significant bit, 32 sub-regions (labeled "Bit 3") are configured to be activated by the third most significant bit, 16 sub-regions (labeled "Bit 4") are configured to be activated by the fourth most significant bit, 8 sub-regions (labeled "Bit 5") are configured to be activated by the fifth most significant bit, and four sub-regions (labeled "Bit 6") are configured to be activated by the sixth most significant bit.

For a color display, each of the sub-regions 1610 may be further divided into display elements for each of the primary colors. For example, one embodiment may use the staggered arrangement depicted in FIG. 8. In the exemplary embodiment of FIG. 12, the sub-regions 1610 are approximately 10 times larger than the sub-regions of the embodiment of FIG. 7. To display the most significant bit of the display driver signal thus requires activation of only 128 sub-regions 1610 rather than activation of 1352 sub-regions 1110 as in the embodiment of FIG. 7.

In the embodiment depicted in FIG. 12, the row and column layout of sub-regions is divided into four quadrants 1630 that are separated by a cross shaped area 1632. The cross shaped area can be further divided into sub-regions 1634. The remaining seven (in a 13 bit color depth embodiment) "less significant bits" are used to drive the display elements in sub-regions 1634. In one embodiment, the small central sub-region 1636 may be left unused leaving 32 sub-regions 1632. In one embodiment, the first less significant bit, e.g., bit seven, can be used to drive 11 of these small sub-regions 1634, bit eight can be used to drive 7 sub-regions 1634, bit nine can be used to drive 4 sub-regions 1634, and bit ten can be used to drive 2 sub-regions 1634. In one embodiment, bits 11, 12, and 13 are each used to drive one sub-region 1634 each. Thus 27 of the 32 cross-hair sub-regions 1634 are driven by the less significant bits. Since these "less significant bits" do not fill all of the crosshair sub-regions 1634, their exact size can be adjusted to achieve precise binary weighting. The impact of these unused and partially used sub-regions 1634 on the overall aperture is approximately 0.1% and is thus generally insignificant. However, the simplification in sub-region layout, e.g. grouping the sub-regions 1634 associated with the less significant bits into a single row and/or column, allows for a further reduction in lead count. In other embodiments, the size of the sub-regions 1634 may be adjusted to achieve various linear and non-linear gradations. In addition, other embodiments may include more or less sub-regions 1634 and the sub-regions 1634 may be dispersed in other manners throughout the pixel.

The lead count for the pixel 1600 illustrated by FIG. 12 can be characterized as:

$$N + [M \cdot c] + 1 + 3 \tag{Eqn. 7}$$

where N represents the leads for each horizontal sub-pixel, M·c represents the leads for each color of each vertical sub-pixel, the additional 1 represents the horizontal crosshair lead, and the additional 3 represents the vertical crosshair leads. Thus, with specific reference to the embodiment described above, the total lead count is 14+(18·3)+1+3=72. This compares very favorably to 312 leads used in the equivalent 13 bit-depth embodiment depicted in FIG. 7.

Since the pixels driven by the "most significant bits" can be kept relatively large, embodiments of this pixel architecture can have high aperture ratios when working with crude design rules. In addition, the artifacts associated with using large pixels, as for example in a large display such as a billboard, can be minimized by distributing one quarter of the sub-regions 1610 assigned to each "most significant" bit across each of the four quadrants 1630 of the pixel 1600. This causes the output energy perceived by the viewer to appear to be coming from across the entire surface of the pixel 1600 and limits the viewer's ability to pick out isolated bright dots from these sub-regions 1610, which may be perceived as artifacts or noise in the displayed image.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A pixel having a bit depth, the pixel comprising:
 a plurality of substantially equally sized display elements each having an "on" position and an "off" position, wherein the display elements each emit visible light when in the "on" position, the plurality of substantially equally sized display elements includes a first group of display elements and a second group of display elements, the display elements of the first group each controlled by $n_1$ bits of a driver signal and having an intensity of a predetermined value when in the "on" position and the display elements of the second group each controlled by $n_2$ bits of the driver signal and having an intensity of a fraction of the predetermined value when in the "on" position, an intensity of the pixel being equal to an intensity of each of the plurality of display elements in the "on" position;
 wherein the pixel is configured such that the first group of display elements provide a brighter output level than that of the second group of display elements, the quantity $n_1$ being less than the quantity $n_2$ such that the bit depth of the pixel comprises a coarse gradation of shade provided by the first group of display elements and a finer gradation of shade provided by the second group of display elements.

2. The pixel of claim 1, further comprising a third group of display elements, the display elements of the third group each having an intensity of less than the fraction of the predetermined value when in the "on" position, the intensity of the pixel being equal to an intensity of each of the plurality of display elements in the "on" position.

3. The pixel of claim 1, wherein an intensity of at least one of the display elements of the second group is configured to change according to a driver signal.

4. The pixel of claim 1, wherein the display elements of the second group include masking that reduces the aperture of the display elements.

5. The pixel of claim 1, wherein at least one of the display elements of the second group has an intensity of one-half the predetermined value.

6. The pixel of claim 1, wherein at least one of the display elements of the second group has an intensity of one-quarter the predetermined value.

7. The pixel of claim 1, wherein the display elements of the second group are masked to provide non-linear increments of intensity up to the predetermined value.

8. The pixel of claim 7, wherein the second group comprises at least four display elements, the at least four display elements having respective intensities of 0.1, 0.2, 0.4, and 0.8 of the predetermined value.

9. The pixel of claim 1, wherein the $n_1$ bits controlling the first group of display elements are more significant in the driver signal than the $n_2$ bits controlling the second group of display elements.

10. The pixel of claim 1, wherein at least some of the display elements comprises an interferometric modulator.

11. A display device comprising:
 a plurality of pixels, each of the pixels configured to have an aperture and a bit depth of p and comprising a plurality of sub-regions;
 a first plurality of sub-regions configured to have a first aperture and responsive to K bits of the p bit depth of the pixel; and
 a second plurality of sub-regions configured to have a second aperture and responsive to at least some of p–K bits of the p bit depth of the pixel;
 wherein the first aperture of the first plurality of sub-regions covers at least about 85% of the aperture of the pixel while the first plurality of sub-regions are controlled by the K bits that are less than or equal to half of the bit depth p.

12. The display device of claim 11, wherein the plurality of sub-regions comprises $2^{K+2}-4$ sub-regions.

13. The display device of claim 11, wherein the first aperture of the first plurality of sub-regions covers more than about 90 percent of the aperture of the pixel.

14. The display device of claim 13, wherein the first aperture of the first plurality of sub-regions covers more than about 98 percent of the aperture of the pixel.

15. The display device of claim 11, wherein the second plurality of sub-regions comprises one or more rows of sub-regions disposed between rows of the sub-regions of the first plurality of sub-regions.

16. The display device of claim 11, wherein the second plurality of sub-regions comprises one or more columns of sub-regions disposed between columns of the sub-regions of the first plurality of sub-regions.

17. The display device of claim 11, wherein the second plurality of sub-regions comprises one or more rows of sub-regions disposed between rows of the sub-regions of the first portion of sub-regions and one or more columns of sub-regions disposed between columns of the sub-regions of the first portion of sub-regions.

18. The display device of claim 11, wherein the second plurality of sub-regions are controlled by the p–K bits.

19. The display device of claim 11, wherein the K bits controlling the first plurality of sub-regions are more significant than the p–K bits controlling the second plurality of sub-regions.

20. The display device of claim 11, wherein at least some of the plurality of pixels comprises one or more interferometric modulator elements.

\* \* \* \* \*